Jan. 5, 1926.  
F. J. MacDONALD  
1,568,562  
METHOD AND APPARATUS FOR SHAPING PLASTIC MATERIAL  
Filed March 5, 1924  3 Sheets-Sheet 1
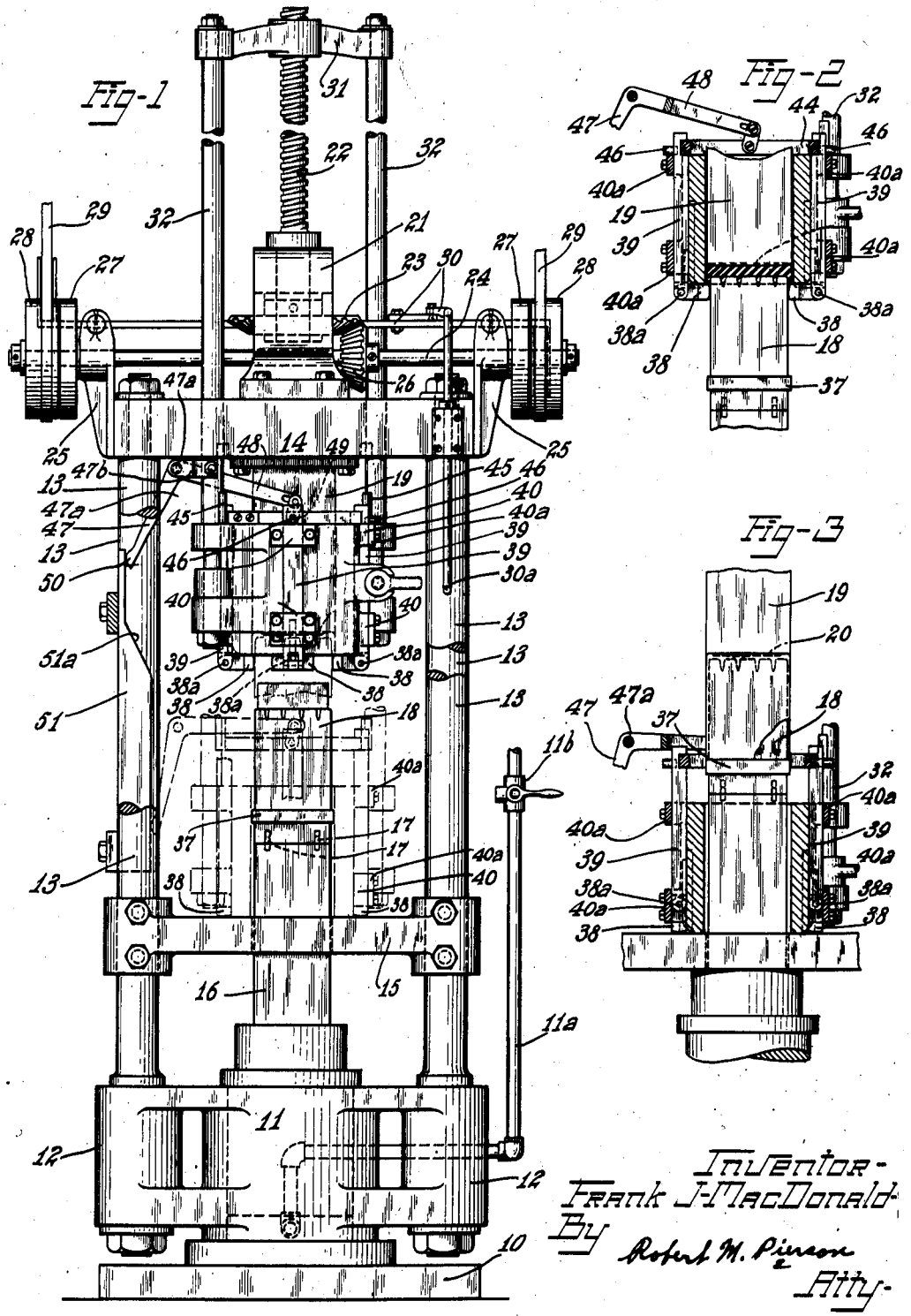

Jan. 5, 1926.
F. J. MacDONALD
1,568,562
METHOD AND APPARATUS FOR SHAPING PLASTIC MATERIAL
Filed March 5, 1924　　3 Sheets-Sheet 2
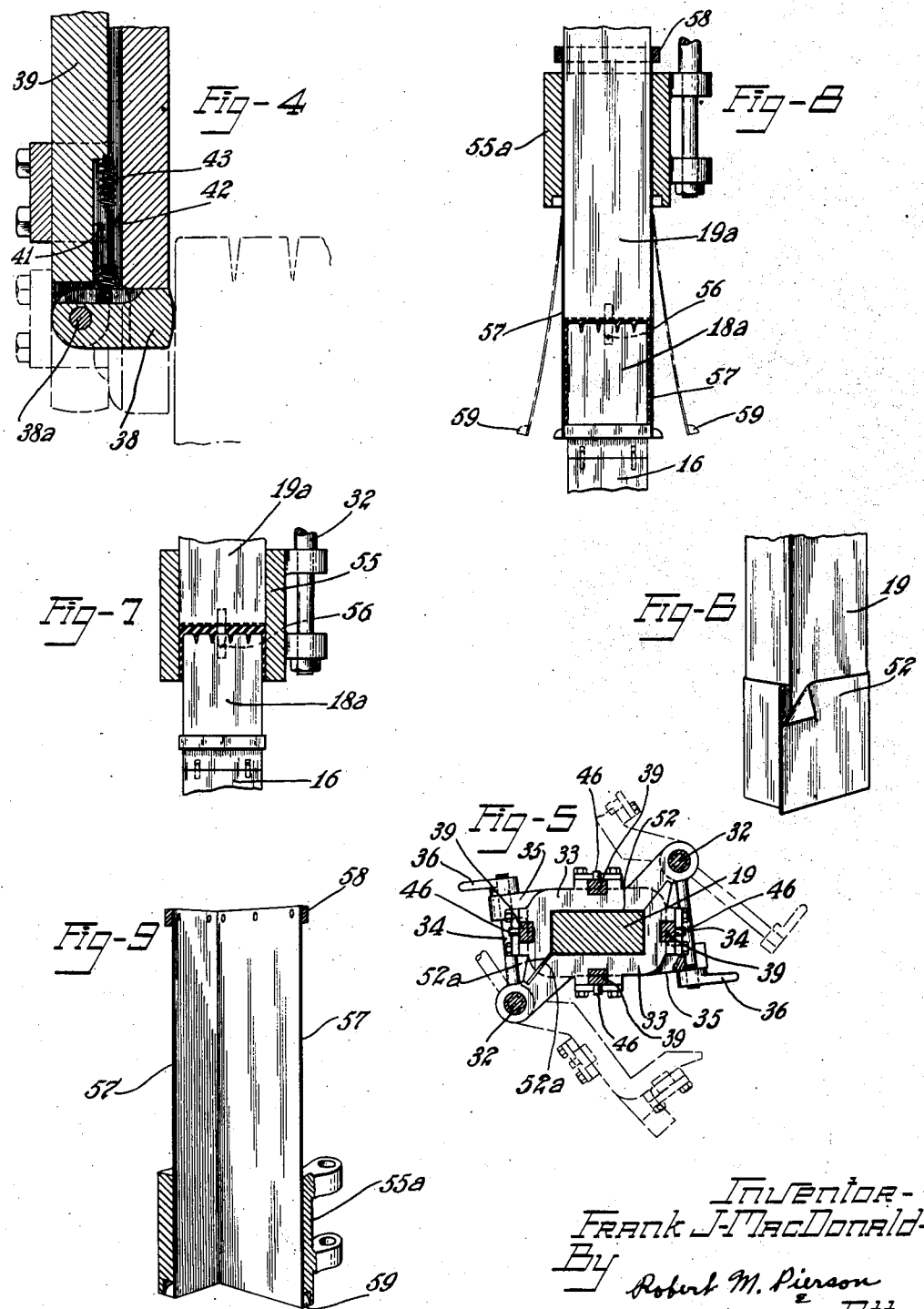

Jan. 5, 1926.  
F. J. MacDONALD  
1,568,562  
METHOD AND APPARATUS FOR SHAPING PLASTIC MATERIAL  
Filed March 5, 1924     3 Sheets-Sheet 3
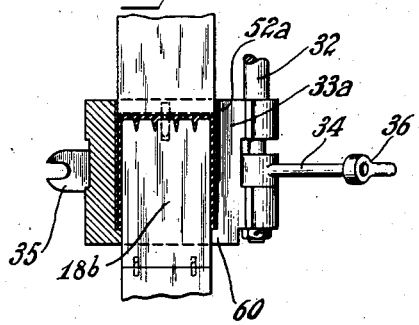
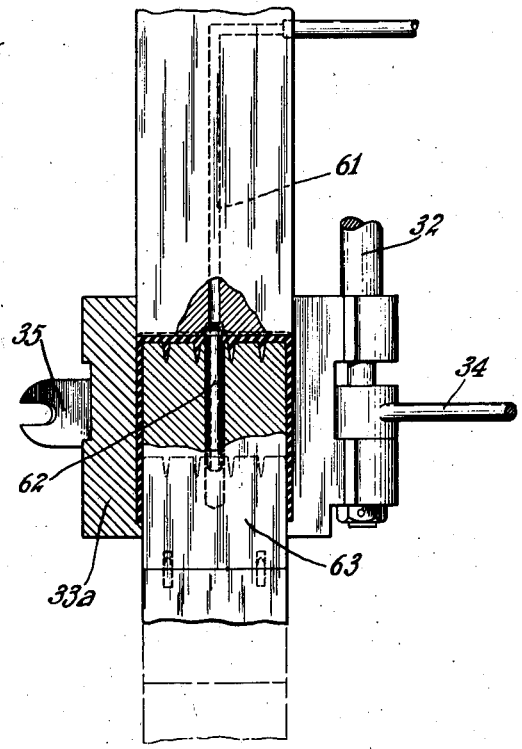
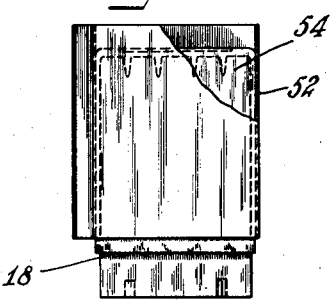
Inventor -
Frank J. MacDonald -
By Robert M. Pierson
Atty -

Patented Jan. 5, 1926.

1,568,562

UNITED STATES PATENT OFFICE.

FRANK J. MACDONALD, OF AKRON, OHIO, ASSIGNOR TO THE B. F. GOODRICH COMPANY, OF NEW YORK, N. Y., A CORPORATION OF NEW YORK.

METHOD AND APPARATUS FOR SHAPING PLASTIC MATERIAL.

Application filed March 5, 1924. Serial No. 697,009.

*To all whom it may concern:*

Be it known that I, FRANK J. MACDONALD, a citizen of the United States, residing at Akron, in the county of Summit and State of Ohio, have invented a certain new and useful Method and Apparatus for Shaping Plastic Material, of which the following is a specification.

This invention relates to methods and apparatus for shaping articles from plastic material, as in the manufacture of battery jars, for example, from an unvulcanized, hard-rubber compound. Although suggestions have been made heretofore of molding such articles by simply forcing a mandrel or plunger into a fixed-bottomed or virtually one-piece mold containing a single, unformed mass of stock, such suggestions, so far as I am aware, have never proven successful in actual practice as applied to the molding of battery jars or like articles.

A common cause of failure or imperfection of result has been that the hard-rubber stock, lying in a substantially unformed mass against the bottom of the mold, has been required to flow with relation to both the mandrel and the mold, and as the stock has flowed about the mandrel, between the latter and the mold, in a comparatively thin sheet or wall, the resistance to flow of such wall has greatly increased as the wall has been extended farther and farther from the unformed portion of the mass, there being a corresponding increase of the area over which the growing wall is in frictional contact with the mandrel and the mold. Not only is there constant increase of such area, but the resistance of the leading portion of the growing wall results in the building up of a greater static pressure per unit area in the plastic mass in the portions of the wall nearer its base, so that the frictional resistance per unit area of such portions is correspondingly increased. The viscosity of the mass thus results in a resistance to the action of the mandrel which increases even more rapidly than the contact area of the growing wall increases.

This effect is so pronounced, and especially in the forming of thin-walled articles such as battery jars, where the relation between the viscosity of the stock and the length and thickness of the wall is unfavorable, that a slight inequality of resistance, as between opposite sides of the structure at the leading portion of the advancing wall, may result in a very great inequality of forces acting in opposite directions laterally against the mandrel at the base of the wall. Thus the method referred to not only requires an excessive amount of power to flow the stock, but the unequal lateral forces against the mandrel which are developed, since perfect balance of resistance at the leading portion of the wall is not obtainable, has commonly resulted in the mandrel being displaced laterally in the mold even when made of very strong construction and provided with strong guiding means, and such displacement of course results in an imperfectly formed article, having a thicker wall at one side than the other.

My general object is to provide improved apparatus and procedure for shaping articles of plastic material, and includes the more accurate and economical forming of such articles by means of mold and mandrel members. More specific objects are economy and uniform quality of product in the molding of deep, hollow articles or containers such as battery jars.

I attain these and related objects by providing apparatus and procedure whereby the article may be molded to form without requiring the plastic material to flow with relation to both the mandrel and the mold throughout large areas of contact, and in which other advantages will become apparent as the description proceeds.

Of the accompanying drawings:

Fig. 1 is an elevation of apparatus embodying and adapted to carry out my invention in its preferred form, as applied to the manufacture of battery jars, parts being broken away.

Fig. 2 is a fragmentary, vertical section through the work and the work-forming members, at the beginning of the molding operation.

Fig. 3 is a similar section of a later stage, the battery jar being completely formed, a part of said jar being sectioned and broken away.

Fig. 4 is a fragmentary, vertical section of the mold and a mandrel-guiding device thereon.

Fig. 5 is a horizontal section through a bottom-pressing member and a sheet-metal battery-jar wrapper thereon, the mold being shown in plan.

Fig. 6 is a perspective view of the bottom-pressing member and the wrapper thereon.

Fig. 7 is a fragmentary, vertical section of the work and the work-forming members according to a modification.

Fig. 8 is a similar section of another modification.

Fig. 9 is a perspective view of a vertically sectioned molding device such as is shown in Fig. 8.

Fig. 10 is a fragmentary, vertical section showing another modification of the work-manipulating instrumentalities.

Fig. 11 is a similar section of another modification.

Fig. 12 is an elevation of a mandrel of the type shown in Figs. 1 to 5 with a battery jar and a sheet-metal wrapper thereon, part of the wrapper being broken away and in section.

Referring first to Fig. 1, the apparatus comprises a base member 10 upon which is mounted a vertical fluid-pressure cylinder 11 provided with a charging and discharging pipe 11a and the usual three-way valve 11b therein. Said cylinder is formed with four laterally projecting brackets, two being shown at 12, 12, in which are mounted respective corner posts or frame members 13, 13, connected at their tops by a cross-beam member or press-head 14 and connected a little above the cylinder 11 by a piston-rod guide 15, the latter being formed with a central guide aperture through which slidably extends a cross-sectionally rectangular piston-rod or plunger 16 from the cylinder 11. Said plunger terminates in a flat, horizontal upper face, provided with dowel pins 17, 17 for positioning a battery-jar mandrel 18 thereon.

Secured to the lower face of the head member 14 is a downwardly projecting, bottom-pressing, mold-guiding, fixed-mandrel member 19 having the same cross-sectional size as a battery jar and formed with a lower end face adapted to press the external bottom face of the jar. Said face may be embossed or ribbed as shown at 20, to form a corresponding impression on the bottom face of the jar.

Mounted upon the head 14 is an arch 21, in the top of which is non-slidably journaled an upwardly projecting screw-shaft 22 provided, within said arch, with a bevel drive gear 23, adapted to be driven in either direction by drive mechanism including a shaft 24 journaled in brackets 25, 25, a bevel gear 26 secured on said shaft in mesh with the gear 23, and a fast pulley 27 and a loose pulley 28 mounted on each of the respective ends of said shaft, and respective belts 29, 29 for the two pairs of fast and loose pulleys. 30 is a belt shifting device provided with a handle 30a and adapted to shift either of the belts onto its fast pulley while leaving the other belt on its loose pulley, so that the screw shaft 22 may be driven in either direction without reversing the direction of a belt.

A yoke 31 formed with a threaded hub portion is mounted upon the upwardly projecting portion of the screw shaft 22, and secured to the respective outer ends of said yoke are two vertical, mold-supporting slide-bars 32, 32 slidably extending through guide apertures formed in the head member 14, and rotatably mounted upon reduced lower end portions of said slide bars respectively are a pair of mold members 33, 33 (see especially Fig. 5), said mold members being adapted to be swung against each other, about the respective slide bars upon which they are mounted, to define a through mold or die aperture having the cross-sectional size and form of the exterior of the battery jar, and adapted to accommodate the bottom-pressing member 19 when said mold members are in the elevated position of said bottom-pressing member. For locking said mold members together, clamping bolts 34, 34 are pivoted upon the respective slide bars 32, are adapted to be swung into and out of slots formed in clamping lugs 35, 35 formed on the respective mold members, and are provided with lever nuts, 36, 36 on their outer ends adapted to engage said lugs, so that the secure clamping together and the opening out of the mold members may be rapidly performed.

In the particular embodiment shown in Figs. 1 to 6, and 12, adapted to be used with a mandrel having a circumferential flange 37 near its base to mold the edge face of the mouth of the jar, I have provided a mandrel-guiding or mold-guiding device adapted to center the mandrel with respect to the mold as they move into telescoped relation, said device comprising four T-shaped guides such as 38, 38, for the four sides of the mandrel respectively, each of said guides being hinged by its stem, on a horizontal axis at 38a, to the lower end of a vertical, guide-supporting slide-bar 39, slidably held against the outer face of the mold member 33, between guide lugs 40, 40 formed thereon, by retaining plates 40a, 40a screw bolted to said lugs. The inner face of each of the four slide bars 39 and the outer face of the mold member are formed with complementary vertical grooves such as 41 and 42 respectively, shown most clearly in Fig. 4, to accommodate a pull spring 43 connecting the slide bar with an intermediate part of the T-shaped mandrel guide 38 and adapted to hold the latter in the horizontal, mandrel-guiding, full line position of Figs. 1, 2 and 4 when the slide bars 39 are in their lowermost position with relation to the mold members, and, by yielding, to permit the slide bars to be elevated with relation to said mold members by means hereinafter described, the guide 38, as the slide bar is so elevated, being forced to the vertical, full line position of Fig. 3 (dotted line position of Figs. 1 and 4), by the lower edge of the mold member, so that said mandrel-guides will swing out of contact with the mandrel 18 and clear the flange 37 of the latter when the lower end of the mold structure, in telescoping with the mandrel, approaches said flange.

For so elevating the slide bars 39 with relation to the mold members upon which they are mounted, a rectangular sliding frame 44 is mounted between the vertical, mold-supporting slide bars 32, said frame having shoes 45, 45 secured to its diagonally opposite corners and adapted to guide it on said bars. Said frame is adapted to be received, when the mold members are closed against each other, in notches formed in the upper end portions of the guide-supporting slide bars 39, but is adapted to permit said bars 39 to swing outward with the mold members when the latter are swung away from each other. For limiting the downward movement of the guide-supporting slide bars with relation to the mold members, the former are provided with respective studs or stops such as 46, 46, adapted to abut the upper retaining plates 40*.

For raising the sliding frame 44 with relation to the mold, as the latter approaches the flange 37 of the mandrel, and permitting it to descend with relation to the mold as the latter rises, in order that the mandrel-guides 38 will be moved from their horizontal, mandrel-guiding position to their vertical flange-clearing positions and back again at each cycle of operations, a cam-lever 47 is pivoted at 47* on a bracket 47b secured to one of the bars 32, said lever being formed with a forked, substantially horizontal, inner arm 48, of which each fork is connected by a link such as 49 with said sliding frame, said forked arm straddling the fixed-mandrel member 19, and the outer arm 50 of said lever 47 is substantially vertical and adapted to engage a vertical cam post 51 mounted upon the frame of the machine and so formed with a cam face 51* as to coact with said lever to effect the relative movement of the guide-supporting slide bars on the mold members as above described.

In the preferred operation of the embodiment of my invention shown in Figs. 1 to 6, and 12, the cylinder 11 being exhausted through the three-way valve 11b, so that the ram 16 is in the low position of Fig. 1, and the mold structure being in its elevated position as there shown in full lines, and the mold members 33 being opened out as indicated by the broken lines in Fig. 5, a sheet metal wrapper 52 is mounted upon the fixed mandrel or bottom-pressing member 19 as shown in Fig. 6. and the mold members 33 are closed thereon as shown in Fig. 5, the frame 44 being received in the notches of the guide-supporting slide bars 39, and the vertical marginal portions 52a, 52a, of the wrapper, projecting from a corner of said bottom-pressing member, being clamped between the mold members by the tightening of the lever nuts 36, so as to be carried downward with the mold as a lining therein, sliding upon and from the bottom-pressing member.

The battery-jar mandrel 18 is then mounted upon the ram 16 and a block of hard rubber compound 53 of determinate quantity sufficient for a jar is placed upon said mandrel as shown in Fig. 1, the stock and shaping members being maintained at a suitable temperature for plasticity of the compound, which may result, as to the shaping members, from the use of successive mandrels which have recently come from the vulcanizer. The cylinder 11 is then charged, raising the battery jar mandrel and the stock thereon until the latter contacts the lower end face of the fixed mandrel 19, within the mold, the mandrel being guided by the members 38, and the force of the cylinder 11 causes the stock to start to flow into the bottom-grooves of the mandrel and about the side faces of the latter as shown in Fig. 2. When the flow of stock has progressed approximately to the condition there shown, the belt shifter 30 is actuated by the operator, whereby the mold structure is slowly driven downward by the mechanism which includes the screw shaft 22.

The cylinder 11 being of such force as rapidly to extrude the rubber stock until the latter abuts the heads of the T-shaped mandrel-guiding members 38, and to be checked in its extruding effect by the contact of the stock with said members, and the downward movement of the mold being begun at about the time of such contact, the mold in its downward movement, by its frictional engagement with the vertical surface of the stock, so assists the flow of the latter downward about the mandrel 18 as to cause the growing battery jar wall to move downward at substantially the same speed as that of the mold, so that substantially no friction between the jar wall and the mold is required to be overcome by the force of the ram 16, but only friction between said wall and the battery jar mandrel, and such friction is substantially if not completely counter-balanced by the downward force of the mold upon the battery jar wall, when the mold is driven downward as described, at appropriate speed. It is not entirely essential, however, that the mold be driven, since the flowing stock itself may be caused by pressure of the plunger 16, to exert a force upon the mold to move the latter along in telescoped relation to the mandrel, and I do not wholly limit my claims to the driving of the mold by a force other than that of the flowing stock.

The mold being free to move with the flowing stock, excessive unequal static pressure in the stock adjacent the leading end of the battery jar mandrel, such as to force the latter out of its centered position in the mold, is avoided, and a smooth, easy flow of the stock about the mandrel is effected. The molding process as just described is continued by the downward movement of the mold until the growing wall of the jar contacts the flange 37 of the mandrel 18 and is trued up by such contact, the guides 38 being swung out through the actuation of the lever 50 by the cam face 51ª as above described, to clear said flange, the retarding effect of said guides upon the flow of stock with relation to the mold not being required when the mold has moved a substantial distance downward, since the area of contact of the work with the mold, or with the sheet metal wrapper or lining 52 therein, is then so great as to prevent such relative movement without the aid of said guides.

When the jar is thus fully formed, the downward movement of the mold may be stopped, the mold opened and the mandrel 18 with the molded jar, 54, and the wrapper 52 thereon, removed and vulcanized, as an assembly such as is shown in Fig. 12, or the downward movement of the mold may be continued until the work extends above it, as shown in Fig. 3. In the latter case, the metal wrapper or mold lining may be omitted in the operation as above described, and the work may be removed from the machine and the latter repeatedly operated without opening the mold, the frame 44 remaining in the notches of the slide bars 39.

In either case, the work being removed, the screw shaft 22 is then operated in the opposite direction, raising the mold again to starting position, the frame 44 falling into position, as the lever 50 leaves the cam face 51ª, to be engaged in the notches of the guide-supporting slide bars 39, if the mold has been opened as described, said slide bars being returned to the full-line position of Fig. 4 by their own weight, and the guides 38 being returned to the mandrel-guiding position there shown, by the springs 43. The operation as described is then repeated.

While my invention is not wholly limited to a structure in which the mold is positively moved with relation to the bottom pressing member and in which the internal mandrel is yieldingly held with relation to the bottom-pressing member and the mold, I prefer this construction because it permits convenient arrangement, support and operation of the instrumentalities, although the force of the yieldingly held internal mandrel against the unformed body of the stock is somewhat reduced by the frictional drag of the battery-jar wall as the latter grows and so increases its area of contact with said mandrel.

The mandrel guiding members 38, while being adapted for easy movement into and out of mandrel-guiding position, are adapted to transmit force from the mandrel to the slide bars 39 transversely of the latter, in which direction they are firmly and accurately held, so as to provide strong resistance against displacement of the mandrel.

In the modification shown in Fig. 7, a one-piece mold 55 is substituted for the hinged mold members 33 above described, and the internal mandrel 18ª, is centered by a dowel 56 projecting downward from the end face of the bottom-pressing member 19ª, said dowel molding an aperture in the floor of the battery jar, which is plugged after the jar is formed.

The use of dowel means interposed operatively between the two male shaping members is described and claimed in my copending application Serial No. 704,503, filed April 5, 1924, and features of the modification shown in Fig. 10 are claimed in my copending application Serial No. 5231, filed January 28, 1925.

In the modification shown in Figs. 8 and 9, four mold-lining members such as 57, 57, for the respective sides of the work, are secured at their tops to a rectangular frame 58 slidably mounted upon the bottom-pressing member 19ª, the mold-lining structure being adapted to be elevated by hand to a position such that its lower end is adjacent the lower end of said bottom-pressing member, and then to be moved downward by the mold 55ª, as a lining therein, the lower ends of the members 57 being provided with horizontal, external ribs 59, 59 adapted to be engaged in a recess, formed in the lower edge of the mold, for compelling said lining structure to move downward with the mold. When the mold is again raised to the position shown in Fig. 8, said lining members may be flexed away from the work, as shown by the broken lines, to effect a progressive separation of the work from the confining means in which it is formed, so as to avoid disfigurement of the work such as might result from suction if such separation were not progressive. The lining or wrapper 52 shown in Figs. 2, 5, 6 and 12 may likewise be progressively stripped from the molded jar if desired, either before or after vulcanization of the jar.

In the modification shown in Fig. 10 the mold comprises two hinged sections such as 33ª, but each section is formed with an internal flange 60 about its lower end adapted to be abutted by the leading edge of the jar wall, to shape the latter, and prevent the escape of the jar material, and to be abutted by a sheet metal lining 52ª within the mold, the mandrel, 18ᵇ, preferably being formed without the usual flange, so that the internally flanged mold may pass to a position entirely below the work, in order that the latter may be removed without opening the mold, if desired. In such operation it is of course not essential that the mold be of the sectional type.

In the modification shown in Fig. 11, the construction shown is the same as that of Fig. 10 except that the bottom-pressing member is formed with a fluid passage 61 terminating at its work-contacting end face, said aperture there communicating with an open ended pipe 62 mounted in a threaded counter-bore at the mouth of said aperture, said pipe being adapted to extend, as a dowel, into an aperture formed in the jar mandrel, 63, for countering the latter, and to conduct a pressure fluid into said aperture, so as to force said fluid between the bottom wall of the jar and the mandrel therein, to effect a separation of the two, for the easy removal of the mandrel from the jar, when the plunger which supports the mandrel is lowered.

The various work-contacting instrumentalities described may be used interchangeable with the actuating mechanism of Fig. 1, and additional modifications may be resorted to without departing from the scope of my invention as claimed.

It will be understood by those skilled in the art that the drag exerted by the mandrel upon the stock may cause a film of the stock adjacent the mandrel to adhere thereto instead of sliding thereon, said film being extended by addition at the leading edge of the wall, through a slight flow of stock in the interior of the wall, and becoming in effect a part of the mandrel. It will also be understood that the character of such flow will depend upon the viscosity of the stock, the thickness of the wall and the coefficient of friction between the stock and the mandrel, and that this behavior of the stock does not detract from the advantages of the invention as described.

In the appended claims the outer mold is referred to as a shaping member, in the singular number, although it may comprise two or more parts, such as the rigid members 33 and their flexible lining 52, which together act as a single member in the molding operation, although not integrally formed.

I claim:

1. The method of shaping an article of plastic material which comprises so pressing a mass of stock against a shaping member as to cause said stock to extend itself as a relatively thin and extensive layer lying against and substantially within the limits of said shaping member while causing another shaping member to move in the same direction with said layer in confining relation thereto and at a speed such as to lessen frictional resistance of the stock as compared with the action of a one-piece plunger mold, as said layer is so extended.

2. The method of shaping an article of vulcanizable plastic material which comprises so pressing a mass of stock against a shaping member as to cause said stock to extend itself as a layer lying against and substantially within the limits of said shaping member while causing another shaping member to move along with said layer, at approximately the same speed, and to press against the same, as said layer so extends itself upon the first shaping member, and vulcanizing the stock in contact wih one of said shaping members.

3. The method of shaping an article of vulcanizable plastic material which comprises so pressing a mass of stock against a surfacing member as to cause said stock to extend itself upon said surfacing member while causing another surfacing member to move along with the stock, at approximately the same speed, and to press against the moving stock as the latter so extends itself, and vulcanizing the stock between said surfacing members.

4. The method of shaping an article of plastic stock which comprises placing a mass of stock in a space substantially enclosed by rigid shaping members and so changing the shape of said space to that of the article to be formed, by relative movement of said shaping members, as to flow the stock into such shape, one of said shaping members being given such relative movement as to move with the flow of stock and at approximately the same speed.

5. The method of shaping an article of plastic material which comprises placing a mass of stock in a space substantially enclosed by three shaping members, and changing the shape of said space to that of the article to be formed by movement of each of said members with relation to the other two, one of said shaping members being given such relative movement as to move with the flow of stock and at a speed such as to lessen frictional resistance of the stock as compared with the action of a one-piece plunger mold.

6. The method of shaping a hollow article of plastic stock which comprises so pressing the stock between a pressing member and a shaping member as to extrude it into but not substantially beyond an annular space defined by said shaping member and another shaping member, while effecting movement of the last mentioned shaping member in contact with and at a speed such as to lessen frictional resistance of the stock as compared with the action of a one-piece plunger mold.

7. The method of applying plastic stock to the interior of a hollow member which comprises flowing the stock by pressure from an unformed mass into an annular layer on the inner face of said hollow member without substantial relative movement between the latter and the adjacent stock of said layer.

8. The method of making a hollow article of vulcanizable plastic material which comprises relatively moving, in telescoped relation, a male shaping member and a female shaping member, while flowing the stock into but not substantially beyond the space between said members, at the leading end of one of the same, the relative movement being at a speed such as to lessen frictional resistance of the stock as compared with the action of a one-piece plunger mold, and vulcanizing the stock in the form which it assumes in said space.

9. The method of applying plastic material to the interior of a hollow member which comprises pushing an unformed mass of plastic stock ahead of a mandrel in said hollow member while resisting the movement of said mass by pressure applied to its leading face, whereby the unformed mass is caused to move with said mandrel with relation to said hollow member and to give off stock into the space between the mandrel and said hollow member.

10. The method of making a hollow, closed ended article from plastic material which comprises molding it from a mass of stock while so moving one of the molding members with relation to the other, in the direction of the flow of stock, as to a substantial degree to avoid relative movement of said member and the flowing stock as compared with the action of a one-piece plunger mold.

11. The method of making a hollow, closed-ended article from plastic material which comprises pushing an unformed mass of stock ahead of a mandrel in a hollow shaping member while resisting the movement of said mass by mechanical pressure applied to its leading face, whereby the unformed mass is caused to move with said mandrel with relation to said hollow member and to give off stock into the space between the mandrel and said member, and releasing the pressure upon said mass before all of it has been so given off, whereby an end closure of stock is left integral with the part so given off.

12. The method of making a hollow article of vulcanizable plastic material which comprises applying a surrounding coating of the plastic stock to a mandrel structure by flowing a mass of stock thereon while causing a surrounding surfacing member to move in the same direction with and to press against the stock as the latter extends itself upon the surface of the mandrel structure, said surfacing member having substantial relative movement past the supply mass of stock, and vulcanizing the stock while it remains between the mandrel structure and said surfacing member.

13. The method of making a hollow article of plastic material which comprises flowing the stock about a mandrel while confining it against said mandrel through the medium of a flexible wrapper structure and moving the wrapper along with and at approximately the same speed as that of the flowing stock, and progressively stripping the wrapper structure therefrom.

14. The method of making a hollow article of a vulcanizable plastic material which comprises flowing the stock from an unformed supply mass into the space between a mandrel and a sheet metal wrapper while exteriorly supporting the wrapper, and vulcanizing the stock with said wrapper thereon.

15. The method of making a hollow article of plastic material which comprises flowing the stock about a mandrel while confining it against the mandrel with a flexible wrapper, exteriorly supporting said wrapper and causing it to move, relatively to the mandrel and to the supply mass of stock, with the flow of stock.

16. Apparatus for shaping an article of plastic material, said apparatus comprising a pair of shaping members adapted to define a relatively thin and extended stock-receiving space substantially coextensive with the article to be formed, and means for flowing the plastic stock into said space, said members being adapted for relative movement during the shaping operation at a speed such as to lessen frictional resistance of the stock as compared with the action of a one-piece plunger mold.

17. Apparatus for shaping an article of vulcanizable plastic material, said apparatus comprising a shaping member, means for so pressing a mass of stock thereagainst as to cause said stock to extend itself upon the surface of said shaping member, and a surfacing member so mounted as to be movable, past the supply mass of stock, in the same direction with the portion of the stock which is so extended, and in confining relation thereto, during the shaping operation, said shaping member and said surfacing member being readily separable from associated elements of the apparatus and adapted to remain in contact with the article during vulcanization.

18. Apparatus for shaping an article of plastic material, said apparatus comprising a pair of shaping members adapted to define a relatively thin and extended stock receiving space substantially coextensive with the article to be formed, and means for flowing the plastic stock into said space, said shaping members being adapted for relative movement during the shaping operation at a speed such as to reduce frictional resistance of the stock as compared with the action of a one-piece plunger mold, and one of said members being readily separable from associated elements of the apparatus and adapted to maintain the shape of the article during vulcanization.

19. Apparatus for shaping a hollow article of plastic material, said apparatus comprising a male shaping member and a female shaping member in telescoped relation and adapted to define an annular stock receiving space substantially coextensive with the article to be formed, and means for flowing stock into said space, said members being adapted to be relatively moved during the shaping operation at approximately the same speed as that at which the stock extends itself in said space.

20. Apparatus for shaping a hollow article of plastic material, said apparatus comprising a male shaping member and a female shaping member in telescoped relation and adapted to define an annular stock-receiving space substantially coextensive with the article to be formed, and means for flowing stock into said space, said members being adapted to be relatively moved at a speed such as to reduce frictional resistance of the stock as compared with the action of a one-piece plunger mold and one of said members being readily separable from associated elements of the apparatus and adapted to maintain the form of the article during vulcanization.

21. Apparatus for shaping an article of plastic material, said apparatus comprising a plurality of shaping members substantially enclosing a space adapted to accommodate an unformed mass of stock, said members being so formed and mounted for such relative movement as to change the shape of said space to that of the article to be formed while one of said members moves with the flow of the stock and at approximately the same speed.

22. Apparatus for shaping an article of plastic material, said apparatus comprising a plurality of rigid shaping members substantially enclosing a space adapted to accommodate a mass of stock, said members being so formed and mounted for such relative movement as to change the shape of said space to that of the article to be formed while one of said members moves with the flow of stock and at approximately the same speed.

23. Apparatus for shaping an article of plastic material, said apparatus comprising a male shaping member, a female shaping member, one of said members being mounted for relative axial movement in telescoped relation to the other, and means, within the shaping portion of said female shaping member, mounted for movement therein during the shaping operation, and adapted to coact with said male member to extrude stock from an unformed supply mass into the space between the latter and said female member.

24. Apparatus for shaping an article of plastic material, said apparatus comprising a hollow shaping member, and means for flowing stock from an unformed mass into an annular layer on the inner face of said hollow member, said hollow member and said means being mounted for such relative movement as to avoid to a substantial degree relative movement of said hollow member and said layer.

25. Apparatus for shaping an article of plastic material, said apparatus comprising a male shaping member and a female shaping member relatively movable axially in telescoped relation during the shaping operation, a member adapted to press stock into the space between the two, and to move with relation thereto during the shaping operation, and positive means for moving one of the three said members with relation to another one of the same, the other member of the three being yieldingly urged, so as to accommodate its movement to the action of said positive means.

26. Apparatus for shaping an article of plastic material, said apparatus comprising a shaping member, a member adapted so to press a mass of stock thereagainst as to cause it to extend itself by flow thereon, a member adapted to move in the same direction as the flowing stock and to confine the same, each of the three members being movable with relation to the others, during the shaping operation, and positive means for moving one of said members with relation to another, the other member of the three being yieldingly urged, so as to accommodate its movement to the action of said positive means.

27. Apparatus for shaping an article of plastic material, said apparatus comprising a female shaping member, and two opposed male shaping members telescoped therewith, each of the three being mounted for relative axial movement with relation to the other two during the shaping operation, and means for forcing said opposed male shaping members toward each other.

28. Apparatus for shaping an article of plastic material, said apparatus comprising a female shaping member, and two opposed male shaping members telescoped therewith, each of the three being mounted for relative axial movement with relation to the other two during the shaping operation, means for forcing said opposed male shaping members toward each other, and means for preserving alignment of said male members.

29. Apparatus for shaping an article of plastic material, said apparatus comprising a female shaping member, two opposed male shaping members telescoped therewith, each of the three being mounted for relative axial movement with relation to the other two during the shaping operation, and yielding means for forcing said opposed male shaping members toward each other.

30. Apparatus for shaping an article of plastic material, said apparatus comprising a female shaping member, two opposed male shaping members telescoped therewith, each of the three being mounted for axial movement with relation to the other two during the shaping operation, means for forcing said opposed male shaping members toward each other, and means for moving said female member with relation to said male members.

31. Apparatus for shaping an article of plastic material, said apparatus comprising a female shaping member, two opposed male shaping members telescoped therewith, each of the three being mounted for relative axial movement with relation to the other two during the shaping operation, means for forcing said opposed male shaping members toward each other, and means for moving said female member with relation to said male members, one of said means being positive and the other yielding.

32. Apparatus for shaping an article of plastic material, said apparatus comprising a mandrel formed with a base flange, a mold adapted to telescope therewith, and mandrel guiding means on said mold, at the mouth thereof, adapted to be retracted from the mandrel to clear said flange as the latter approaches.

33. Apparatus for shaping an article of plastic material, said apparatus comprising a mandrel formed with a base flange, a mold adapted to telescope therewith, mandrel guiding means on said mold, at the mouth thereof, adapted to be retracted from the mandrel to clear said flange as the latter approaches, and a cam-mechanism adapted so to retract said mandrel-guiding means.

34. Apparatus for shaping an article of plastic material, said apparatus comprising a mandrel formed with a base flange, a mold adapted to telescope therewith, and mandrel guiding means on said mold, at the mouth thereof, adapted to be retracted from the mandrel to clear said flange as the latter approaches, said means comprising slides mounted on said mold, and mandrel contacting members pivoted on said slides so as to transmit force from the mandrel to said slides transversely of the latter.

35. Apparatus for shaping an article of plastic material, said apparatus comprising a mandrel formed with a base flange, a mold adapted to telescope therewith, and mandrel guiding means on said mold, at the mouth thereof, adapted to be retracted from the mandrel to clear said flange as the latter approaches, said means comprising mandrel-contacting members adapted to serve as abutments for stock forced between the mandrel and the mold.

36. Apparatus for shaping an article of plastic material, said apparatus comprising a male shaping member and a female shaping member in telescoped relation, a member adapted to force stock into the space between said shaping members, each of the three members being mounted for movement with relation to the other two during the molding operation, and means for pressing the leading edge of a mass of stock thus forced into said space.

37. Apparatus for shaping an article of plastic material, said apparatus comprising a female shaping member, two opposed male shaping members telescoped therewith, each of the three being mounted for relative axial movement with relation to the other two during the shaping operation, means for forcing said opposed male shaping members toward each other to extrude stock from between the two into the space between one of the same and the female member, and means for pressing the leading edge of a wall of stock thus extruded.

38. Apparatus for shaping an article of plastic material, said apparatus comprising a shaping member, a member for so pressing a mass of stock thereagainst as to cause it to extend itself by flow thereon, a member adapted relatively to move past the supply mass of stock, in the same direction as the flowing stock, and to confine the latter, and a thin, detachable liner for the member that so moves.

39. Apparatus for shaping an article of plastic material, said apparatus comprising a plurality of rigid shaping members substantially enclosing a space adapted to accommodate a mass of stock of a quantity sufficient for the article, said members being so formed and mounted for such relative movement as to change the shape of said space to that of the article to be formed while one of said members moves with the flow of stock, and a layer of flexible sheet material in the member that so moves.

40. Apparatus for shaping an article of plastic material, said apparatus comprising a female shaping member, two opposed male shaping members telescoped therewith, each of the three being mounted for relative axial movement with relation to the other two, means for forcing said opposed male shaping members toward each other, and a flexible lining of sheet material in said female member.

41. Apparatus for shaping an article of plastic material, said apparatus comprising a sectional female shaping member, two opposed male shaping members telescoped therewith, each of the three being mounted for relative axial movement with relation to the other two during the shaping operation, and means for forcing said opposed male shaping members toward each other.

42. Apparatus for shaping an article of plastic material, said apparatus comprising a female shaping member, a male shaping member telescoped therewith, the two being adapted to define a relatively thin and extended stock-receiving space substantially coextensive with the article to be formed, one of said shaping members being of sectional construction for withdrawal from the work, and a member for flowing stock into the space between the two, each of said shaping members being mounted for movement with relation to the other two during the shaping operation.

43. Apparatus for shaping an article of plastic material, said apparatus comprising a female shaping member, two opposed male shaping members telescoped therewith, each of the three being mounted for relative axial movement with relation to the other two during the shaping operation, means for forcing said opposed male shaping members toward each other, said female member comprising sections, means for clamping said sections together, and a sheet metal lining for said female member having a marginal portion adapted to be clamped between said sections.

44. Apparatus for shaping an article of plastic material, said apparatus comprising a sectional female shaping member, means for securing the sections thereof in closed relation, two opposed male shaping members telescoped with said female member, mandrel-guiding means slidably mounted for axial movement on said sections, and cam-actuated means for sliding said mandrel-guiding means on said sections, said mechanism being so constructed as to engage with said mandrel-guiding means when said sections are in closed relation and to permit the free opening out of said sections.

45. Apparatus for shaping a hollow article of plastic material, said apparatus comprising a fixedly mounted, freely projecting presser member having substantially the cross-sectional form of the article to be formed, means for moving a mandrel toward said presser member in axial alignment therewith, a mold structure adapted slidably to fit said projecting member in telescoped relation, and means for moving said mold structure axially along said projecting member and said mandrel during the shaping operation.

46. Apparatus for shaping a hollow article of plastic material, said apparatus comprising a fixedly mounted, freely projecting presser member having substantially the cross-sectional form of the article to be formed, means for moving a mandrel toward said presser member in axial alignment therewith, a mold structure adapted slidably to fit said projecting member in telescoped relation, and means for moving said mold structure axially along said projecting member and said mandrel, the last said means comprising pivot members parallel with the line of such movement, and said mold structure comprising sections pivoted on said pivot members.

In witness whereof I have hereunto set my hand this 29th day of February, 1924.

FRANK J. MacDONALD.